(12) United States Patent
Meinheit et al.

(10) Patent No.: US 8,925,309 B2
(45) Date of Patent: Jan. 6, 2015

(54) METHOD FOR PREDEFINING A ROTATIONAL SPEED OF A DRIVE MACHINE OF A DRIVE SYSTEM

(75) Inventors: Hinrich Meinheit, Besigheim (DE); Helge Boehm, Ludwigsburg (DE); Jochen Pfister, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 675 days.

(21) Appl. No.: 13/214,172

(22) Filed: Aug. 20, 2011

(65) Prior Publication Data

US 2012/0042642 A1 Feb. 23, 2012

(30) Foreign Application Priority Data

Aug. 21, 2010 (DE) .......................... 10 2010 035 060

(51) Int. Cl.
| | |
|---|---|
| *F16D 31/00* | (2006.01) |
| *B60W 50/00* | (2006.01) |
| *B60W 30/188* | (2012.01) |
| *B60W 50/06* | (2006.01) |
| *E02F 9/22* | (2006.01) |

(52) U.S. Cl.
CPC ....... *B60W 50/0097* (2013.01); *B60W 30/1882* (2013.01); *B60W 50/06* (2013.01); *E02F 9/2253* (2013.01); *E02F 9/2289* (2013.01); *E02F 9/2296* (2013.01); *B60W 2050/0028* (2013.01); *B60W 2300/17* (2013.01); *B60W 2710/0644* (2013.01); *Y02T 10/84* (2013.01)

USPC .............................................. 60/368; 60/327

(58) Field of Classification Search
USPC ................................ 60/431, 327, 368; 701/99
See application file for complete search history.

(56) References Cited

U.S. PATENT DOCUMENTS

| | | | | |
|---|---|---|---|---|
| 5,968,104 | A | * | 10/1999 | Egawa et al. .................... 701/50 |
| 6,640,951 | B2 | * | 11/2003 | Bamberger et al. ......... 192/85.01 |
| 2004/0199300 | A1 | * | 10/2004 | Gustafsson et al. .............. 701/1 |
| 2005/0071066 | A1 | | 3/2005 | Rose et al. |

FOREIGN PATENT DOCUMENTS

| | | | |
|---|---|---|---|
| EP | 1 754 643 | 2/2007 | |
| EP | 1873031 B1 | * 2/2009 | ............ B60W 10/06 |
| WO | 2007/063185 A1 | 6/2007 | |
| WO | 2008/041892 A1 | 4/2008 | |

OTHER PUBLICATIONS

Machine English Translation of EP 1873031B1.*

* cited by examiner

*Primary Examiner* — Edward Look
*Assistant Examiner* — Daniel Collins
(74) *Attorney, Agent, or Firm* — Maginot, Moore & Beck LLP

(57) ABSTRACT

A method for predefining a rotational speed of a drive machine of a drive system is disclosed. The method involves at least the drive machine and a hydrostatic drive unit, wherein the rotational speed which is to be predefined for the drive machine is determined as a function of an instantaneous system state and a predicted system state of the drive system.

14 Claims, 2 Drawing Sheets

METHOD FOR PREDEFINING A ROTATIONAL SPEED OF A DRIVE MACHINE OF A DRIVE SYSTEM

This application claims priority under 35 U.S.C. §119 to German patent application no. DE 10 2010 035 060.5, filed Aug. 21, 2010 in Germany, the disclosure of which is incorporated herein by reference in its entirety.

BACKGROUND

The present disclosure relates to a method for predefining a rotational speed of a drive machine of a drive system comprising at least the drive machine and a hydrostatic drive unit.

The disclosure is described essentially with reference to drive systems which are embodied as (mobile) working machines (for example excavators, mobile cranes, handling equipment), wherein a hydrostatic drive unit is driven by a drive machine, usually an internal combustion engine. The hydrostatic drive unit usually comprises one or more hydraulic pumps which are driven by the drive machine and one or more hydraulic motors which are connected thereto (for rotational movement) and/or hydraulic cylinders (for linear movement) and, if appropriate, valves and the like for actuating the loads.

In the known working machines, a setpoint rotational speed for the internal combustion engine is frequently derived directly from a pedal position or joystick position. In a simple refinement, an idling automatic system is used for this, which system predefines a low idling rotational speed as a setpoint rotational speed in the case of non-activation of the input devices, and predefines a fixed relatively high setpoint working rotational speed in the case of activation of the input devices. The solution is disadvantageous, in particular, with respect to the fuel consumption since the working rotational speed is not adapted to the actual power requirement.

In addition it is possible to predefine a variable setpoint working rotational speed as a function of the activation of the input devices. However, this proportional approach is also disadvantageous with respect to the response behavior and fuel consumption since the efficiency of the turbo-charged internal combustion engines which are generally used and which essentially also determines the response behavior of a working machine at the overall system level depends not only on the rotational speed but also, for example, on the current charge pressure.

It is therefore desirable to predefine a rotational speed for a drive machine of a drive system in such a way that the consumption and, in particular, response behavior are improved.

SUMMARY

According to the disclosure, a method is proposed for predefining a rotational speed of a drive machine of a drive system comprising at least the drive machine and a hydrostatic drive unit having the features set forth below. Advantageous refinements are the subject matter of the following description.

The features of the disclosure include a variable adaptive setpoint rotational speed predefinition for the drive machine, for example a diesel engine, of the drive system on the basis of the evaluation of different system states, of an instantaneous actual state, of an instantaneous setpoint state and of a predicted setpoint state. The new setpoint rotational speed which is to be correspondingly predefined is determined essentially by the anticipated change in the drive system state (for example change in the power output).

In contrast to known refinements, the predefinition of the rotational speed is not carried out solely as a function of the instantaneous power requirement but also of an anticipated change in the power requirement. The setpoint rotational speed is expediently raised if a change in load is expected in the drive system.

The features of the disclosure provide the advantageous possibility of countering at an early point an imminent rise in power and of promptly bringing about an increase in the rotational speed of the drive machine before the real increase in load occurs. The drive machine can therefore speed up and, in the case of an internal combustion engine, build up charge pressure. During the change in load, the increased rotational speed can be reduced and the built-up kinetic energy can therefore be utilized, and the engine operated when the charge pressure is already increased. Both of these things increase the system dynamics, i.e. the response behavior of the drive system.

After the change in load, the rotational speed for the drive machine is expediently reduced again. In order to maintain a load level which has been reached it is advantageously sufficient to set again a relatively low rotational speed so that careful treatment, saving of fuel etc. are possible here compared to known systems. It is possible to make advantageous use of the fact that the quasi-static power output of a drive machine, such as for example of a diesel engine, already reaches the level of the rate of power significantly below the rated rotational speed.

It is therefore possible to keep the dynamics of the drive system at a high level which is acceptable for the driver even at the reduced rotational speed which is favorable in terms of consumption.

What is referred to as a basic rotational speed, and which is preferably significantly below the rated rotational speed of the drive machine, serves as a starting point for the calculation of the setpoint rotational speed. The basic rotational speed can be approximately 70-75% of the rated rotational speed. The basic rotational speed serves as a minimum operating rotational speed which is sufficient for carrying out a number of operating tasks. The basic rotational speed can be set and/or regulated in a known fashion, for example on the basis of an idling control system mentioned in the introduction. The basic rotational speed is not dependent on the anticipated change in the load state but rather, for example, only on input variables (for example selection of the rotational speed by the driver).

An offset rotational speed is added to this basic rotational speed as a function of the anticipated change in the load state of the drive system. The change in the load state is calculated in a suitable fashion taking into account the output values of the input devices and the sensor data from the drive system. The core of this calculation is the comparison of the current system state (at the time $t_0$) with a predicted system state (at the time $t_1$). The difference $t_1-t_0$ is preferably below 1 second, preferably approximately 200-500 ms.

The starting point for the determination of the predicted system state is the setpoint system state at the time $t_0$ which is derived from the way in which the input devices are operated. In this context, the respective system state is expediently defined by load and pump volume flows, load and pump pressures as well as load and pump power levels (mechanically and hydraulically) and/or by means of a suitable selection of these variables. The actual state is determined taking into account the output values of the input devices and their profile in the past by means of a suitable calculation based on a system model which describes the drive system and the dynamics thereof. The informativeness of this system model can be improved by adding measurement data from the drive system. The predicted system state is determined by taking into account the current actual and setpoint system states and the predicted actuation signals. The core of the prognostic calculations is a suitable system model which describes the drive system and the dynamics thereof.

The calculation of the offset rotational speed which is added to the basic rotational speed is carried out on the basis of a comparison of the actual system state with the predicted system state. The offset rotational speed can therefore occur, for example, as a function of the difference between an actual pump power and the predicted pump power. If the predicted power is greater (preferably by a minimum amount) than the current power, a value greater than zero is calculated for the offset rotational speed. According to the disclosure, a high level of dynamics can therefore be achieved by correspondingly predefining the offset rotational speed, wherein the long-term power requirement is satisfied by correspondingly predefining the basic rotational speed.

In one advantageous refinement, the offset rotational speed is filtered, with the result that, for example, an increase occurs quickly but a decrease occurs slowly. The filtering is preferably dependent in an adaptive fashion on the current or predicted system variables. This provides the person skilled in the art with many possible ways of configuring the filtering.

A computing unit according to the disclosure, for example a control unit of a mobile working machine, is configured in terms of programming technology to carry out a method according to the disclosure.

Further advantages and refinements of the disclosure emerge from the description and the appended drawings.

It goes without saying that the features which are mentioned above and which are to be explained below can be used not only in the respectively specified combination but also in other combinations or in isolation without departing from the scope of the present disclosure.

The features of the disclosure are illustrated schematically in the drawing on the basis of exemplary embodiments and are described in detail below with reference to the drawing.

DETAILED DESCRIPTION

Figure 1:
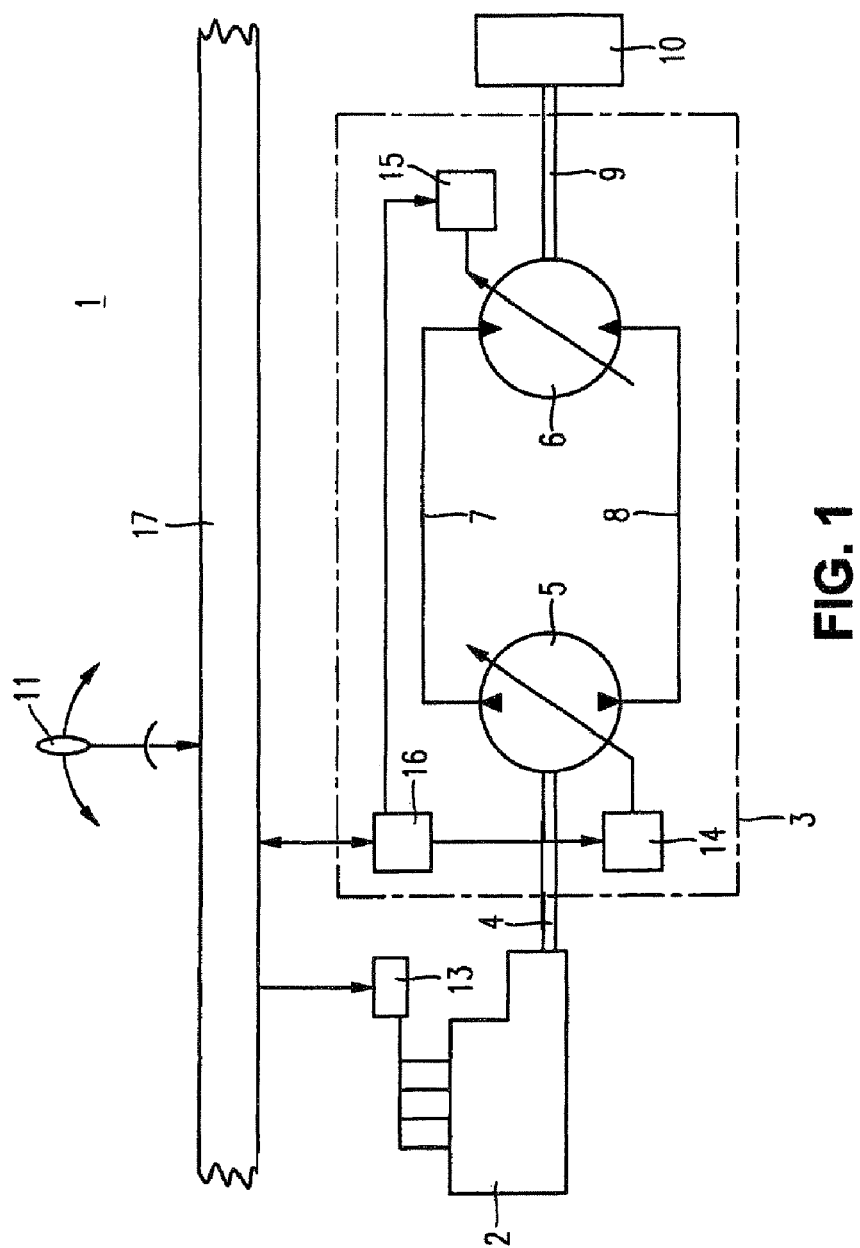
FIG. 1 is a schematic view of a drive system for carrying out the method according to the disclosure.

In the text which follows, a drive system, such as can be used as the basis for the present disclosure, is explained on the basis of FIG. 1 in EP 1 754 643 A1. FIG. 1 is a schematic illustration of such a drive system and is denoted in its entirety by 1. The drive system 1, or a mobile working machine, has here an internal combustion engine 2 as a drive machine, which internal combustion engine 2 is embodied as a diesel engine and drives a hydrostatic drive unit 3. The internal combustion engine 2 is connected for this purpose via a drive shaft 4 to a hydraulic pump 5, for example an axial piston pump, of adjustable design. The adjustable hydraulic pump 5 is connected via a first working line 7 and a second working line 8 to a hydraulic motor 6, for example an axial piston motor, which is also of adjustable design here, in a hydraulic circuit. The hydrostatic valve unit 3 serves, for example, as a propulsion drive of the mobile working machine 1. The adjustable hydraulic motor 6 of the hydrostatic drive unit 3 is connected for this purpose via a second drive shaft 9 to a driven wheel 10 of the mobile working machine. In addition to a propulsion drive, a mobile working machine has at least one working hydraulic system (not shown) in which said hydraulic pump or a further hydraulic pump is used to supply at least one hydraulic cylinder and/or hydraulic motor. Valves for actuating the loads are usually also present.

In order to predefine the direction of travel and the velocity, an input device, for example an accelerator pedal 11 is used, said input device being used to generate a control signal by an operator of the excavator. In the present example, the accelerator pedal 11 is connected via a bus 17 to a control device 13 which is configured in terms of programming technology to carry out a method according to the disclosure. For this purpose, the control device is connected to the diesel engine 2 in order to be able to predefine a rotational speed of the diesel engine through corresponding actuation.

Since the hydraulic pump 5 and hydraulic motor 15 are, as mentioned, of adjustable design, the hydrostatic drive unit 3 has adjustment devices 14 and 15 which set the delivery volume of the adjustable hydraulic pump 5 and/or the absorption volume of the adjustable hydraulic motor 6 in such a way that the rotational speed of the drive shaft 4 is converted into a rotational speed of the second drive shaft 9 which corresponds to the driver's request. The adjustment devices 14 and 15 are connected to a control device 16 for the purpose of actuation, said control device 16 also being connected to the bus 17. The control devices 13 and 16 can also be embodied in a combined fashion.

Figure 2:
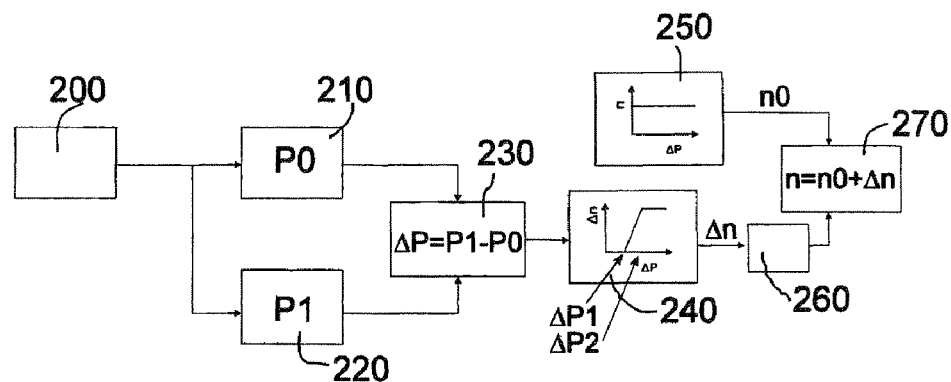
FIG. 2 shows a schematic flowchart of a preferred embodiment of the disclosure.

FIG. 2 is a roughly schematic illustration of an exemplary embodiment of a method according to the disclosure using a flowchart, and is described in the text which follows. In a step 200, a series of variables, for example actuator signals, machine data, sensor signals etc. are determined and used to calculate a current system state in step 210 and a predicted system state in step 220.

In the present example, the power requirement of the drive system 1 (cf. FIG. 1), in this case the current power requirement P0 and the predicted power requirement P1 are determined as the system state. In a step 230, a difference $\Delta P$ between the predicted power requirement P1 and the current power requirement P0 is determined.

The power difference which is determined is fed to a calculation block 240 which determines an offset rotational speed $\Delta n$ on the basis of the power difference $\Delta P$. Different possibilities for determining the latter are conceivable, wherein the precise configuration is up to a person skilled in the art. In the diagram according to FIG. 2, for example a rule is used in which the offset rotational speed $\Delta n$ is zero if the power difference $\Delta P$ is below a first threshold value $\Delta P1$, and between the first threshold value $\Delta P1$ and a second threshold value $\Delta P2$ the offset rotational speed $\Delta n$ behaves in a linear fashion with respect to the power difference $\Delta P$, and the offset rotational speed $\Delta n$ remains constant above the second threshold value $\Delta P2$.

In a block 250, a basic rotational speed n0, which, in particular, does not depend on the power difference $\Delta P$, is determined. The basic rotational speed n0 can be predetermined according to known methods or independently of the power. The basic rotational speed is used to satisfy a long-term power requirement, whereas the offset rotational speed is predominantly used to increase the dynamics of the drive system.

The basic rotational speed n0 and the offset rotational speed $\Delta n$ are fed to an addition block 270 which determines the predefined rotational speed n therefrom. The offset rotational speed Δn is fed here via a filter 260 which ensures that there is a rapid increase and a slow decrease in the offset rotational speed Δn. Current and/or predicted system variables, such as for example the current power requirement P0, predicted power requirement P1 etc. can be fed to the filter via an adaptive feedback, wherein the filter function is changed or can be changed as a function of these system variables.

The determination of a predicted system state will now be explained in more detail with reference to FIG. 3. The predicted system state, here the required power P1, at a time t1 is determined here on the basis of the instantaneous actual state, here the instantaneous power P0, at the time t0.

Figure 3:
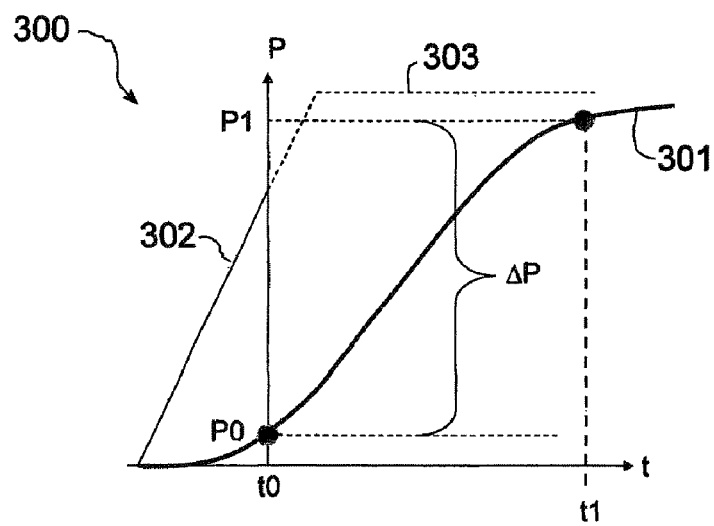
FIG. 3 is a schematic view of the determination of a predicted system state.

In FIG. 3, a required power P is plotted against the time t in a diagram 300. The time profile of the power is denoted by 301. Furthermore, an output value, for example the position of an accelerator pedal, is illustrated and denoted by 302. The setpoint state of the machine results from the accelerator pedal position at the time t0. The difference between the actual state and the setpoint state initially predefines the direction of the power development.

A future accelerator pedal position 303 is predicted using a model on the basis of the prior history of the accelerator pedal position. This can take place in a simple embodiment by using extrapolation over a short time period, for example a few 10 ms. In turn, the future profile of the power 301 is calculated from the predicted accelerator pedal position 303 by means of a system model. In order to determine the power difference ΔP, the difference between the power P1 at the time t1 and the power P0 at the time t0 is determined. The time period t1-t0 is expediently in a range from 100 to 500 ms.

What is claimed is:

1. A method, comprising:
predefining a rotational speed of a drive machine of a drive system comprising at least the drive machine and a hydrostatic drive unit,
wherein the rotational speed which is to be predefined for the drive machine is determined by a computing unit as a function of an instantaneous system state and a predicted system state of the drive system;
wherein the predicted system state is determined on the basis of predicted actuation values of input devices; and
wherein the predicted actuation values are determined on the basis of instantaneous and/or earlier actuation values of the input devices; and operating the drive machine at the predefined rotational speed.

2. The method according to claim 1, wherein a system model of the drive system is used to determine the predicted system state.

3. The method according to claim 1, wherein the rotational speed which is to be predefined for the drive machine is predefined as a sum of a basic rotational speed and an offset rotational speed, wherein the offset rotational speed is determined as a function of the instantaneous system state and the predicted system state of the drive system.

4. The method according to claim 3, wherein the offset rotational speed is filtered by a filter before the determination of the rotational speed which is to be predefined.

5. The method according to claim 4, wherein the filter is configured so that it chronologically changes a profile of the offset rotational speed.

6. The method according to claim 5, wherein the filter is configured so that it chronologically delays a decrease in the offset rotational speed.

7. The method according to claim 4, wherein a function of the filter is predefined adaptively as a function of system variables.

8. A computing unit which is configured to carry out a method according to claim 1.

9. A method, comprising:
predefining a rotational speed of a drive machine of a drive system comprising at least the drive machine and a hydrostatic drive unit,
wherein the rotational speed which is to be predefined for the drive machine is determined by a computing unit as a function of an instantaneous system state and a predicted system state of the drive system;
wherein the rotational speed which is to be predefined for the drive machine is predefined as a sum of a basic rotational speed and an offset rotational speed, wherein the offset rotational speed is determined as a function of the instantaneous system state and the predicted system state of the drive system; and
wherein the offset rotational speed is filtered by a filter before the determination of the rotational speed which is to be predefined; and operating the drive machine at the predefined rotational speed.

10. The method according to claim 9, wherein a system model of the drive system is used to determine the predicted system state.

11. The method according to claim 9, wherein the filter is configured so that it chronologically changes a profile of the offset rotational speed.

12. The method according to claim 11, wherein the filter is configured so that it chronologically delays a decrease in the offset rotational speed.

13. The method according to claim 9, wherein a function of the filter is predefined adaptively as a function of system variables.

14. The method according to claim 9, wherein the predicted system state is determined on the basis of predicted actuation values of input devices.

* * * * *